United States Patent [19]

Coppola et al.

[11] 4,080,415

[45] Mar. 21, 1978

[54] METHOD OF PRODUCING HIGH DENSITY SILICON CARBIDE PRODUCT

[75] Inventors: John A. Coppola; Richard H. Smoak, both of Lewiston, N.Y.

[73] Assignee: The Carborundum Company, Niagara Falls, N.Y.

[21] Appl. No.: 743,448

[22] Filed: Nov. 22, 1976

[51] Int. Cl.² .............................................. C04B 35/56
[52] U.S. Cl. ........................................ 264/65; 106/44; 264/332
[58] Field of Search .................... 264/65, 332; 106/44

[56] References Cited

U.S. PATENT DOCUMENTS

| | | | |
|---|---|---|---|
| 3,469,976 | 9/1969 | Iler | 264/65 |
| 3,554,717 | 1/1971 | Shaffer et al. | 264/332 |
| 3,717,694 | 2/1973 | Mt. Pleasant | 264/332 |
| 3,968,194 | 7/1976 | Prochazka | 264/65 |
| 4,004,934 | 1/1977 | Prochazka | 106/44 |

Primary Examiner—Donald J. Arnold
Assistant Examiner—John A. Parrish
Attorney, Agent, or Firm—David E. Dougherty; Raymond W. Green; Donald C. Studley

[57] ABSTRACT

Disclosure is made of a high-density, high-strength silicon carbide ceramic material that is produced using a silicon carbide powder containing boron or boron-containing compound as a densification additive by the utilization of boron in the sintering atmosphere.

8 Claims, No Drawings

METHOD OF PRODUCING HIGH DENSITY SILICON CARBIDE PRODUCT

BACKGROUND OF THE INVENTION

Silicon carbide, a crystalline compound of metallic silicon and nonmetallic carbon, has long been known for its hardness, its strength, and its excellent resistance to oxidation and corrosion. Silicon carbide has a low coefficient of expansion, good heat transfer properties, and maintains high strength at elevated temperatures. In recent years, the art of producing high density silicon carbide bodies from silicon carbide powders has been developed. Methods include reaction bonding, chemical vapor deposition, hot pressing and pressureless sintering (initially forming the article and subsequently sintering). Examples of these methods are described in U.S. Pat. Nos. 3,853,566; 3,852,099; 3,954,483; and 3,960,577. The high density silicon carbide bodies so produced are excellent engineering materials and find utility in fabrication of components for turbines, heat exchange units, pumps, and other equipment or tools that are exposed to severe wear and/or operation under high temperature conditions. The present invention relates methods of producing silicon carbide articles that have high-density and high-strength characteristics.

In order to obtain high-density and high-strength silicon carbide ceramic materials, various additives have been utilized. For example, a method of hot pressing silicon carbide to densities in order of 98% of theortical by addition of aluminum and iron as densification aids is disclosed by Alliegro, et al., J. Cram. Soc., Vol. 39, No. 11, Nov., 1956, pages 386 to 389. They found that a dense silicon carbide could be produced from a powder mixture containing 1% by weight of aluminum. Their product had a modulus of rupture of 54,000 psi at room temperature and 70,000 psi at 1371° C. More recent advance is the use of boron as a densification additive, usually in the range of between about 0.3 and about 3.0 percent by weight of the powder. The boron additive may be in the form of elemental boron or in the form of boron-containing compounds, for example, boron carbide. Examples of boron-containing silicon carbide powders may be found in U.S. Pat. Nos. 3,852,099; 3,954,483; and 3,968,194.

SUMMARY OF THE INVENTION

It has now been found that higher densification can be obtained when the sintering operation of silicon carbide containing powders which include boron as a densification aid are carried out in the presence of a boron containing atmosphere. It is postulated that, by performing the sintering operation in an atmosphere containing boron, the amount of boron which would be normally removed from the powder compact is reduced and that the sintered ceramic product has a more consistent composition and is less porous than sintered products produced when boron is only used as an additive. Boron may be fed into the sintering operation in the form of a gas such as boron trichloride in mixtures with inert gases usually used, namely nitrogen, argon, or helium. Boron may also be added to the furnace atmosphere by inclusion into the sintering chamber of compounds of boron which have a significant vapor pressure at the sintering temperature. Such compounds may suitably be introduced into the sintering chamber by forming a solution or slurry of the boron compound and applying the solution or slurry to the interior of the chamber. Suitably, acetone is used as the carrier, but other carriers such as water or other available solvents may be employed, their only purpose is to enable good distribution of the boron material on the walls of the sintering chamber. Alternatively, boron may be added to the furnace atmosphere by the use in the sintering chamber of a boron compound, per se, or by the use of furnace components, parts and the like, which contain a significant amount of boron.

DETAILED DESCRIPTION

The silicon carbide powders which may be utilized to produce high-density, high-strength silicon carbide ceramic material which may be used in the present invention are those found in the prior art. For example, those described in U.S. Pat. Nos. 3,852,099; 3,954,483; and 3,968,194. The present invention relates to the use of a boron-containing atmosphere during the sintering operation. The use of boron in the sintering atmosphere yields marked improvement when the partial pressure of boron in the atmosphere is equal to or greater than the equilibrium vapor pressure of the boron contained in the silicon carbide powder compact.

The silicon carbide powders containing boron or boron-containing compounds as densification aids generally contain boron in amounts between about 0.2 and about 3.0 percent by weight. The final sintered material usually contains about the same percentage of boron. It has been found that sintering in a boron containing atmosphere does not appear to substantially change the amount of boron in the final product. The boron atmosphere appears to inhibit the escape of boron from the powder compact during the sintering operation without adding any significant amount of boron to the product. Thus, in pressureless sintering, a silicon carbide powder having from about 0.1 to about 2.0 percent by weight excess carbon and containing from about 0.1 to about 5.0 percent by weight of boron added as boron carbide is pressed into a powder compact and sintered at 2100° C in a furnace in an inert atmosphere such as argon or helium which is free of boron. The bulk density of sintered compacts formed by this method is typically less than 2.9 gm/cm$^3$ (90.3% of theoretical density). However, if a similar powder compact is sintered in the same manner in an inert atmosphere such as argon or helium in which the partial pressure of boron is about $10^{-7}$ atmospheres or greater, the resultant bulk density of the sintered compact is typically greater than 2.98 gm/cm$^3$ (92.8% of theoretical density).

EXAMPLE 1

CONTROL EXPERIMENT

A submicron silicon carbide powder having the characteristics listed below was used to demonstrate this invention.

Oxygen — 0.3 wt%
Free Carbon — 2.0
Aluminum — .002
Iron — .01
Specific Surface Area — 12 m$^2$/gm This powder, 99.5 parts, was mixed with 0.7 parts of boron carbide, 100 parts deionized water and 3 parts polyvinyl alcohol. The mixture was rolled in a plastic jar for five hours using tungsten carbide balls to promote mixing. The resultant mixture was poured into a glass tray and the moisture removed by drying in a vacuum oven. The dried powder cake was screened through a 60 mesh screen and pressed at 12,000 psi into pellets, 1⅛ inches diameter and weighing approximately 10 gm each. These pellets were inserted into a graphite crucible, the ends of the crucible were closed, and the crucible plus pellets were pushed at approximately ½ inch per minute through a 6 diameter graphite resistance heating element tube furnace. The hot zone of this tube furnace was maintained at 2,150° C and the residence time of the powder compacts in this hot zone was approximatly 25 minutes. The sintered powder compacts which contained approximately 0.5 percent by weight boron before being run through the furnace were found to contain approximately 0.05 percent by weight boron after the sintering operation was complete. The bulk density of these powder compacts averaged 2.57 gm/cm$^3$ (80.1% of theoretical).

EXAMPLE 2

BORON IN THE FURNACE COMPONENTS

A graphite crucible, similar to the one described in Example 1 was painted with a slurry of boron carbide and acetone to form a liquid vehicle in an amount sufficient to provide 0.7% by weight boron carbide based on the weight of the graphite crucible. A second set of powder compacts of the composition of Example 1 was prepared by the method described in Example 1 and was placed into the prepared crucible containing a thin coating of boron carbide. The bulk density of these compacts, measured after undergoing a sintering operation described in Example 1, was determined to average 3.08 gm/cm$^3$ or 96% of theoretical density. The boron content of the sintered compacts was determined to be 0.5% by weight.

EXAMPLE 3

HOT PRESSING

The powder described in Example 1, 99.5 parts, was admixed with 1.2 parts boron nitride (approximately 0.43% boron by weight) in slurry form using acetone as the liquid vehicle. The resultant mixture was then dried and granulated by passing it through a 60 mesh screen.

A hot pressing mold and plungers made of graphite and containing no boron were used in this experiment. The granulated powder was placed into this graphite mold, the plungers inserted and a pressure of approximately 100 psi was applied. The mold was heated within an induction coil to 2000° C over a period of two hours; pressure was applied when the temperature reached 1650° C and after a hold period of 30 minutes at 2000° C the power to the furnace was shut off, the pressure being released when the temperature reached 1750° C. After cooling in the mold, the hot pressed silicon carbide article was removed and found to have a bulk density of 2.95 gm/cm$^3$ (91.9% of theoretical).

A second set of hot pressing mold and plungers, similar to that described above, was coated with a slurry of boron carbide in acetone to an extent that boron carbide in an amount equal to approximately 0.7% by weight of the weight of the plungers and mold set was applied. Approximately 100 gm of the granulated mix described in Example 1, but with the addition of 1.2 parts of boron nitride was placed into this mold and pluggers set. After performing the hot pressing procedure similar to that described above, the hot pressed silicon carbide article was removed from the mold and found to have a bulk density of 3.18 gm/cm$^3$ (99.1% of theoretical).

What is claimed is:

1. A method of sintering silicon carbide powders containing boron or boron-containing compounds as densification aids to produce a high density silicon carbide ceramic material which comprises the step of sintering such powders in an atmosphere containing boron, wherein the partial pressure of boron in the sintering atmosphere is equal to or greater than the equilibrium vapor pressure of the boron in the silicon carbide powder during sintering of said powder.

2. The method of claim 1 wherein the silicon carbide containing powders include boron in an amount between about 0.1 and about 5.0 percent by weight.

3. The method of claim 1 wherein the atmosphere containing boron includes an inert gas.

4. The method of claim 3 wherein the inert gas is nitrogen.

5. The method of claim 3 wherein the inert gas is argon.

6. The method of claim 3 wherein the inert gas is helium.

7. The method of claim 1 wherein the boron in the atmosphere is introduced as boron chloride.

8. The method of claim 1 wherein the boron in the atmosphere is introduced as boron carbide.

* * * * *